United States Patent
Nagai

(10) Patent No.: US 10,521,163 B2
(45) Date of Patent: Dec. 31, 2019

(54) IMAGE FORMING APPARATUS, STATE CONTROLLING METHOD FOR THE APPARATUS, AND IMAGE FORMING SYSTEM

(71) Applicant: SHARP KABUSHIKI KAISHA, Sakai, Osaka (JP)

(72) Inventor: Yuhsuke Nagai, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/991,288

(22) Filed: May 29, 2018

(65) Prior Publication Data
US 2018/0349074 A1 Dec. 6, 2018

(30) Foreign Application Priority Data
Jun. 1, 2017 (JP) ................. 2017-109343

(51) Int. Cl.
*G06F 3/12* (2006.01)
*H04N 1/00* (2006.01)

(52) U.S. Cl.
CPC .......... *G06F 3/1229* (2013.01); *G06F 3/1221* (2013.01); *G06F 3/1236* (2013.01); *H04N 1/00214* (2013.01); *H04N 1/00233* (2013.01); *H04N 1/00244* (2013.01)

(58) Field of Classification Search
None
See application file for complete search history.

(56) References Cited

U.S. PATENT DOCUMENTS

| 7,698,574 | B2 * | 4/2010 | Morimoto | B41J 29/393 713/300 |
| 8,374,515 | B2 * | 2/2013 | Shioyasu | H04N 1/00347 399/37 |
| 8,902,441 | B2 * | 12/2014 | Satoh | G06F 3/126 358/1.13 |
| 9,104,422 | B2 * | 8/2015 | Imaizumi | G06F 1/3284 |
| 2012/0243022 | A1 * | 9/2012 | Kamei | G06F 1/3284 358/1.13 |

FOREIGN PATENT DOCUMENTS

JP 2007-133759 A 5/2007
JP 2011-186897 A 9/2011

* cited by examiner

*Primary Examiner* — Paul F Payer
(74) *Attorney, Agent, or Firm* — ScienBiziP, P.C.

(57) ABSTRACT

An image forming apparatus includes a communication device that receives print data from an external information device; a storage device that stores the print data; an image forming unit that prints out the print data; and a control unit that performs control so as to select any of multiple power states at least including a quick response available state and a response available state. The control unit transmits the print data to an external image forming apparatus in response to a request from the external image forming apparatus, determines whether at least one external certain image forming apparatus is capable of communication if a power-off request is submitted in the quick response available state, and makes the transition to the response available state if the external certain image forming apparatus is not capable of communication.

8 Claims, 11 Drawing Sheets

FIG. 6

Built-in print server

Select job

| File name | Login name | Date |
|---|---|---|
| Business report | | June 01, 2017, 11:30 |
| Accounting report | | June 01, 2017, 11:40 |
| Report of office hours | | June 01, 2017, 11:50 |

Change copies
Copies  1  [−] [+]

Monochrome printing
Delete data after printing

Print

Job situation

Delete

Select all

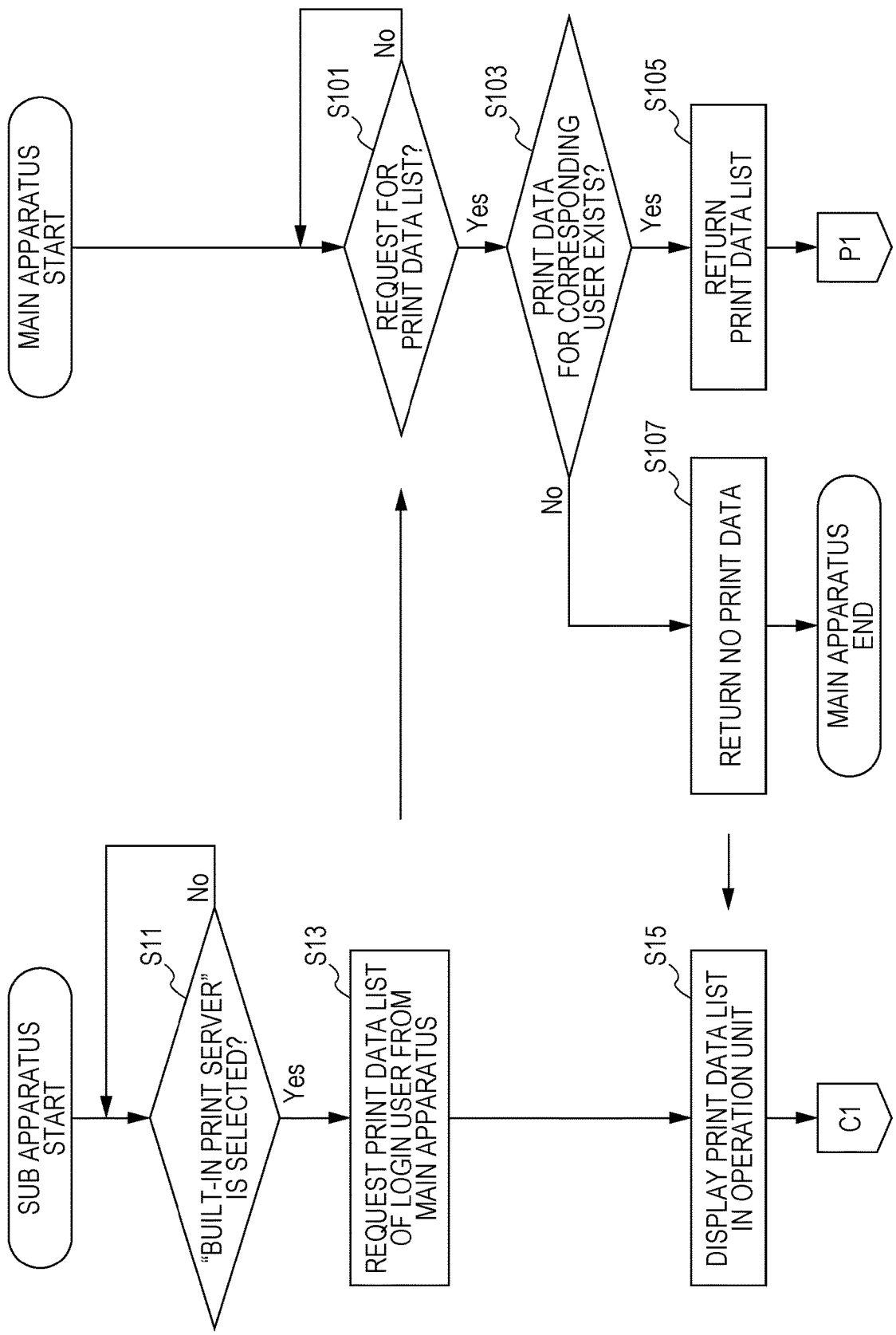

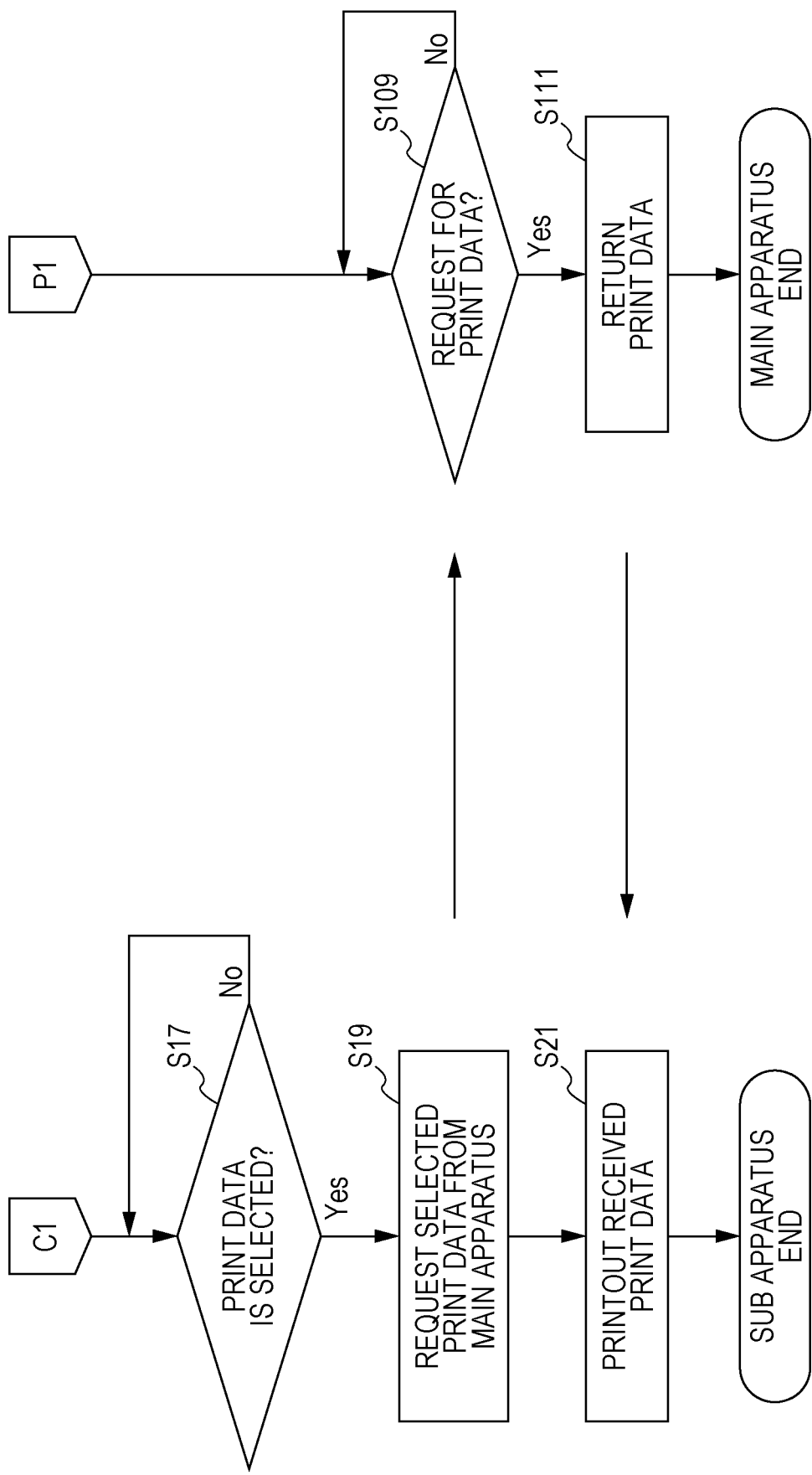

IMAGE FORMING APPARATUS, STATE CONTROLLING METHOD FOR THE APPARATUS, AND IMAGE FORMING SYSTEM

BACKGROUND

1. Field

The present disclosure relates to an image forming apparatus, a state controlling method for the image forming apparatus, and an image forming system. More particularly, the present disclosure relates to control of the power state of an image forming apparatus having a function to transmit print data stored in the host apparatus to an external image forming apparatus for printing.

2. Description of the Related Art

Printing systems are known in which one image forming apparatus is caused to operate as a print server in an environment in which multiple image forming apparatuses are communicably connected to each other for no-use of a dedicated print server. Printing systems are known in which, in building of each printing system, a main apparatus is automatically determined from the image forming apparatuses around users without setting of the main apparatus and sub apparatuses by the users, the determined image forming apparatus is set as the main apparatus, and the sub apparatus members are registered in the main apparatus (for example, refer to Japanese Unexamined Patent Application Publication No. 2011-186897).

In addition, among the printing systems installing multiple image forming apparatuses, printing systems are known in which all the image forming apparatuses are not moved to a power saving mode and at least one image forming apparatus is set to a standby state to improve the power saving performance of the entire system (for example, refer to Japanese Unexamined Patent Application Publication No. 2007-133759).

Such a printing system that does not use the dedicated print server is also referred to as a built-in print server in this specification. The configurations to realize the built-in print server are not limited to the ones disclosed in Japanese Unexamined Patent Application Publication No. 2011-186897 and Japanese Unexamined Patent Application Publication No. 2007-133759 and various aspects are available. For example, the main apparatus and the sub apparatuses are set in advance for the multiple image forming apparatuses. A user generates data to be printed using an information device. The information device is set in advance so as to transmit the generated print data to the main apparatus. The main apparatus receives and stores the print data transmitted from the information device. Upon storage of the print data in the image forming apparatus set as the main apparatus, printing is enabled not only from the main apparatus but also from any sub apparatus.

In output of the print data, the user is capable of accessing the print data stored in the main apparatus from an arbitrary sub apparatus around the user even if the apparatus is not the main apparatus. In other words, in response to the operation by the user with the sub apparatus, the sub apparatus accesses the print data stored in the main apparatus to acquire the print data and prints out the acquired print data.

In such a printing system, the user is not aware of the setting state of the main apparatus and the sub apparatuses each time the printing is performed after the setting of the main apparatus and the sub apparatuses is finished. The user is capable of acquiring the printout not only from the main apparatus but also from an arbitrary sub apparatus without a complicated operation.

The user performs a power-off operation of the main apparatus, as in the sub apparatuses, with no regard to the fact that the image forming apparatus is the main apparatus. In addition, such an image forming apparatus has a power saving setting in which, regardless of the main apparatus or the sub apparatus, the image forming apparatus is autonomously changed to a power saving state when a predetermined condition is met.

In access to the print data in the main apparatus from the sub apparatus, the main apparatus to which the sub apparatus accesses may be set to the power saving state. In such a case, the sub apparatus is forced to wait for starting of the printing process until the main apparatus returns from the power saving state and is capable of accessing the print data. As a result, it may take some time to perform the printing or a situation may occur in which communication timeout is caused during the waiting time and the printing is terminated without printing out the print data in the main apparatus.

SUMMARY

It is desirable to provide an image forming apparatus, a state controlling method for the image forming apparatus, and an image forming system, which control print data stored in a storage device so that the print data is reliably and rapidly accessible from an external image forming apparatus.

According to an aspect of the disclosure, there is provided an image forming apparatus including a communication device that receives print data from an external information device; a storage device that stores the received print data; an image forming unit that prints out the print data stored in the storage device; and a control unit that performs control so as to select any of multiple power states at least including a quick response available state in which the image forming apparatus is capable of communication and is accessible to the print data and a response available state in which the image forming apparatus is not accessible to the print data although being capable of communication and has power consumption smaller than that in the quick response available state. The control unit transmits the print data to an external image forming apparatus in response to a request from the external image forming apparatus, determines whether at least one external certain image forming apparatus is capable of communication if a power-off request is submitted in the quick response available state, and makes the transition to the response available state if the external certain image forming apparatus is not capable of communication.

According to another aspect of the disclosure, there is provided an image forming apparatus capable of communicating with an external image forming apparatus. The image forming apparatus includes a control unit that controls the image forming apparatus so as to operate in a first working state or a second working state having power consumption smaller than that in the first working state. Upon acceptance of a request to change to the second working state in the first working state, the control unit controls the image forming apparatus so as to make the transition to the second working state if the image forming apparatus is not capable of communicating with the external image forming apparatus.

According to another aspect of the disclosure, there is provided a state controlling method causing a computer controlling an image forming apparatus to perform receiving print data from an external information device and storing the print data in a storage device; transmitting, upon reception of a request from an external image forming apparatus, the print data to the image forming apparatus; and changing one power state to another power state, among multiple power states at least including a quick response available state in which the image forming apparatus is capable of communication and is accessible to the print data and a response available state in which the image forming apparatus is not accessible to the print data although being capable of communication and has power consumption smaller than that in the quick response available state. Upon reception of a power-off request in the quick response available state, it is determined whether an external certain image forming apparatus is capable of communication and the power state is changed to the response available state if the external certain image forming apparatus is not capable of communication.

According to another aspect of the disclosure, there is provided an image forming system including an image forming apparatus serving as a main apparatus; at least one image forming apparatuses serving as a sub apparatus; and at least one information device. The main apparatus, the sub apparatus, and the information device are communicably connected to each other. The main apparatus includes a main apparatus communication device that receives print data from any information device; a main apparatus storage device that stores the received print data; a main apparatus image forming unit capable of printing the print data; and a main apparatus control unit that transmits the print data to the sub apparatus in response to a request from the sub apparatus and performs control so as to select any of multiple power states at least including a quick response available state in which the main apparatus is capable of communication and is accessible to the print data and a response available state in which the main apparatus is not accessible to the print data although being capable of communication and has power consumption smaller than that in the quick response available state. The sub apparatus includes a sub apparatus communication device that requests print data stored in the main apparatus and receives the print data; a sub apparatus image forming unit that prints out the print data received from the main apparatus; and a sub apparatus control unit that controls a process concerning the printing. If a power-off request is received in the quick response available state, the main apparatus control unit determines whether the sub apparatus is capable of communication and change the power state of the main apparatus to the response available state if the sub apparatus is not capable of communication.

According to the present disclosure, in the image forming apparatus, since the control unit determines whether an external certain image forming apparatus is capable of communication if a power-off request is submitted in the quick response available state and changes the quick response available state to the response available state if the external certain image forming apparatus is not capable of communication, the print data stored in the storage device is capable of reliably and rapidly accessed from an external image forming apparatus. Accordingly, it is possible to reliably and rapidly perform the printing of the print data using the external certain image forming apparatus.

Similar effects and advantages are achieved in the state controlling method for the image forming apparatus and the image forming system of the present disclosure.

BRIEF DESCRIPTION OF THE DRAWINGS

FIG. 6 is a third diagram for describing an exemplary printing operation using the function of the built-in print server in the first embodiment;

FIG. 7A is a first flowchart illustrating exemplary processes performed by the main apparatus and a sub apparatus in printing of print data stored in the main apparatus in the sub apparatus in the first embodiment;

FIG. 7B is a second flowchart illustrating the exemplary processes performed by the main apparatus and the sub apparatus in printing of print data stored in the main apparatus in the sub apparatus in the first embodiment;

DESCRIPTION OF THE EMBODIMENTS

The present disclosure will herein be described in detail with reference to the drawings. The following description is only examples and is not intended to limit the present disclosure.

First Embodiment

<<Configurations of Image Forming System and Image Forming Apparatus>>

Figure 1:
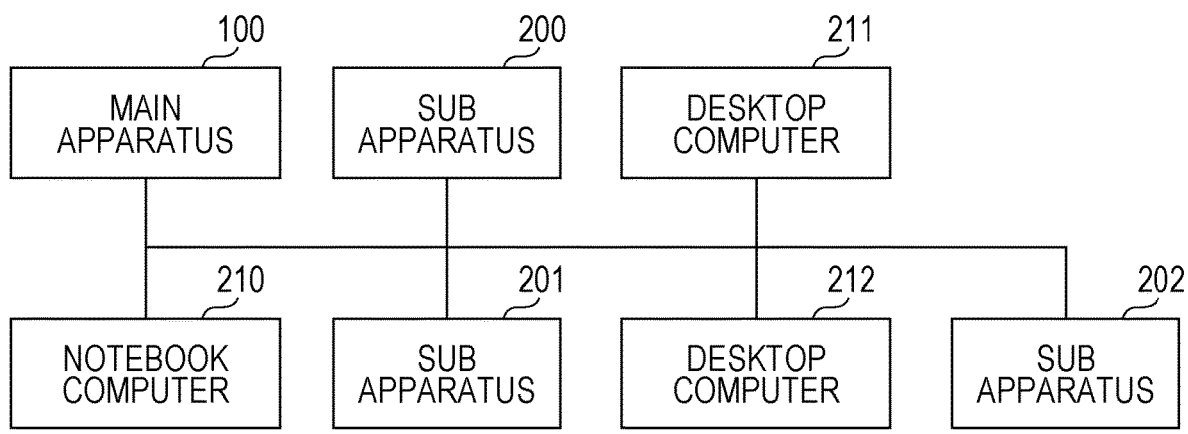
FIG. 1 is a block diagram illustrating an exemplary configuration of an image forming system according to a first embodiment.

FIG. 1 is a block diagram illustrating an exemplary configuration of an image forming system according to a first embodiment. Referring to FIG. 1, the image forming system includes a main apparatus 100, a first sub apparatus 200, a second sub apparatus 201, a third sub apparatus 202, a notebook computer 210, a first desktop computer 211, and a second desktop computer 212, which are connected to each other via a network.

Each of the notebook computer 210 and the desktop computers 211 and 212 creates content to be printed in any of the main apparatus 100 and the sub apparatuses 200, 201, and 202 and transmits the created content to the corresponding apparatus, among the main apparatus 100 and the sub apparatuses 200, 201, and 202.

The main apparatus and the sub apparatuses are determined by a service engineer who performs the setup or an administrator who administers the network, for example, when multiple image forming apparatuses are connected to one network. The service engineer or the administrator sets an arbitrary image forming apparatus as the main apparatus and sets the other image forming apparatuses as the sub apparatuses.

Figure 2:
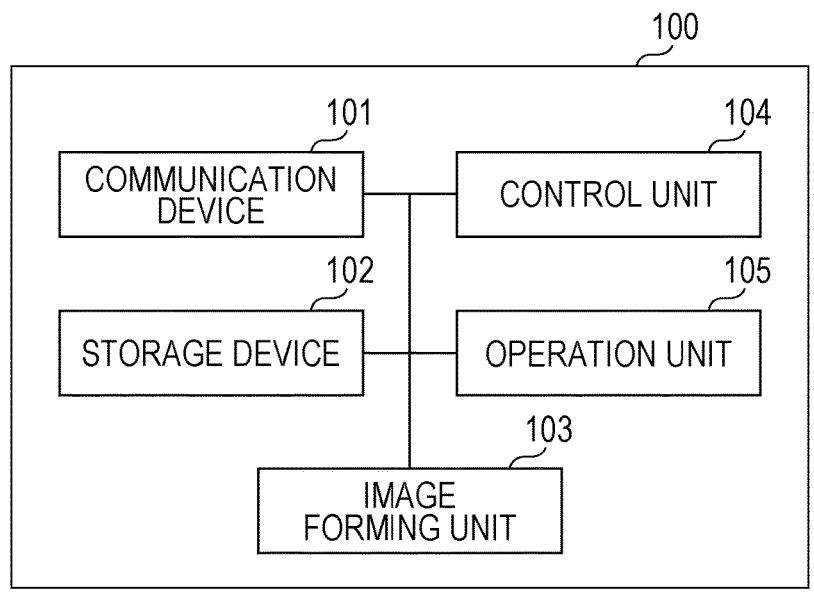
FIG. 2 is a block diagram illustrating an exemplary configuration of a main apparatus illustrated in FIG. 1.

FIG. 2 is a block diagram illustrating an exemplary configuration of the main apparatus 100 illustrated in FIG. 1. The main apparatus 100 is a typical example of the image forming apparatuses in the first embodiment. The sub apparatuses 200, 201, and 202 of the first embodiment have configurations similar to that of the main apparatus 100.

Referring to FIG. 2, a communication device 101 is a network interface circuit and is used to communicate with an external device connected to the main apparatus 100 via the network. The communication may be wired communication or wireless communication and the communication method is not particularly restricted.

A storage device 102 is a non-volatile memory and stores programs executed by a central processing unit (CPU) in a control unit 104 described below. In addition, the storage device 102 stores an access history, which is a history of reception of a transmission request for print data from external devices, the print data that is capable of being printed using an image forming unit 103 described below, and a flag indicating whether the host apparatus is set as the main apparatus in a built-in print server function. Specific examples of the hardware of the storage device 102 include a flash memory and a hard disk device. The storage device 102 in the main apparatus 100 stores the print data as a built-in print server.

The storage device 102 not only stores the print data as the print server but also may store print data to be printed in the host apparatus, as in a normal image forming apparatus.

Since the sub apparatuses 200, 201, and 202 have configurations similar to that of the main apparatus 100, any image forming apparatus composing the image forming system may be set as the main apparatus. The storage device 102 in the image forming apparatus set as the main apparatus stores the print data as the print server.

The image forming unit 103 converts the print data stored in the storage device 102 into printable data and prints out the converted data. The conversion into the printable data is realized by, for example, an interpreter or a renderer. The data converted in the above manner is printed out. Any printing method may be used. For example, an electrophotographic method is used.

The control unit 104 includes peripheral circuits including the CPU, an input-output circuit, and a timer circuit. The control unit 104 controls the operation of each component in the main apparatus 100. In particular, the control unit 104 controls a working state and a power state of each image forming apparatus, as control that has close relation to the present disclosure.

An operation unit 105 is a circuit used by the main apparatus 100 to receive an instruction from the user. The operation unit 105 is exemplified as various operation switches including a power switch or a touch panel disposed on the surface of a display apparatus. The power switch is not a circuit switch that is disposed in a power supply circuit of the image forming apparatus and that directly turns on and off a power supply but a switch that transmits a power-on request and a power-off request to the control unit 104. Turning on and off of the power supply is controlled by the control unit 104.

As described above, in the image forming system illustrated in FIG. 1, in which the multiple image forming apparatuses are communicably connected to each other via the network, the user is capable of performing normal printing and performing printing using the function of the built-in print server.

First, the normal printing will be simply described. For example, it is supposed that the user generates data to be printed using the notebook computer 210. In this case, the user transmits the data to be printed to any of the main apparatus 100 and the sub apparatuses 200, 201, and 202 connected to the notebook computer 210 over the network. The main apparatus or the sub apparatus to which the print data is transmitted performs the printing based on the transmitted data. The normal printing is performed in the above manner.

Next, the printing using the function of the built-in print server will be described. In the image forming system illustrated in FIG. 1, one image forming apparatus is set in advance as the main apparatus. The printing is performed using the main apparatus as the built-in print server. Since the main apparatus functions as the built-in print server, a dedicated server is not used. The image forming apparatuses other than the main apparatus acquire the print data from the main apparatus and print out the print data.

<<Printing Process Using Built-in Print Server>>

Figure 3:
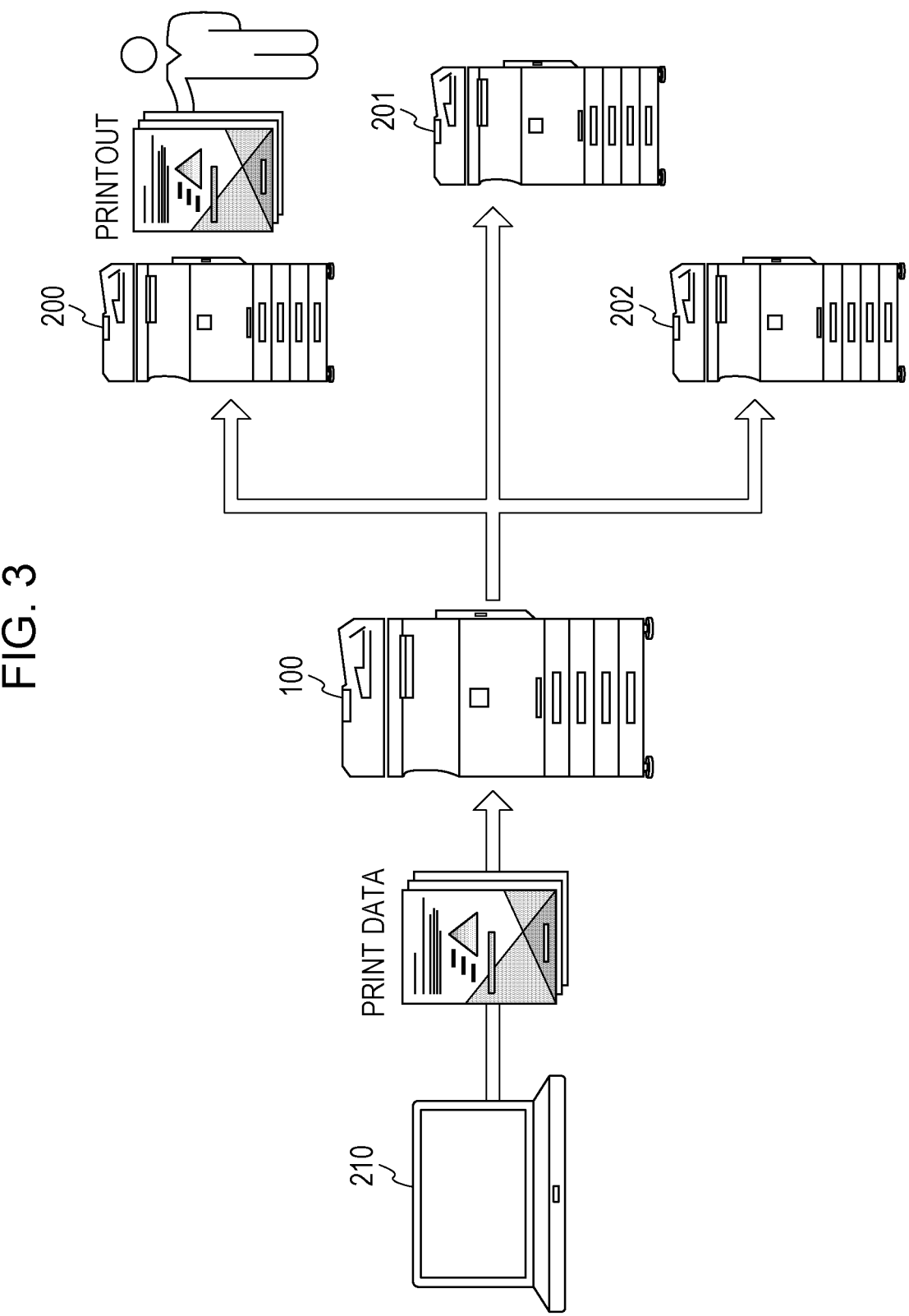
FIG. 3 is a diagram for describing how data to be printed is moved in the first embodiment.

FIG. 3 to FIG. 6 are diagrams for describing the printing using the function of the built-in print server in the first embodiment. FIG. 3 is a diagram for describing how data to be printed is moved in the first embodiment. For example, it is supposed in FIG. 3 that the user creates content to be printed using the notebook computer 210. In this case, the user transmits the data to be printed to the main apparatus 100 connected to the notebook computer 210 over the network.

Figure 4:
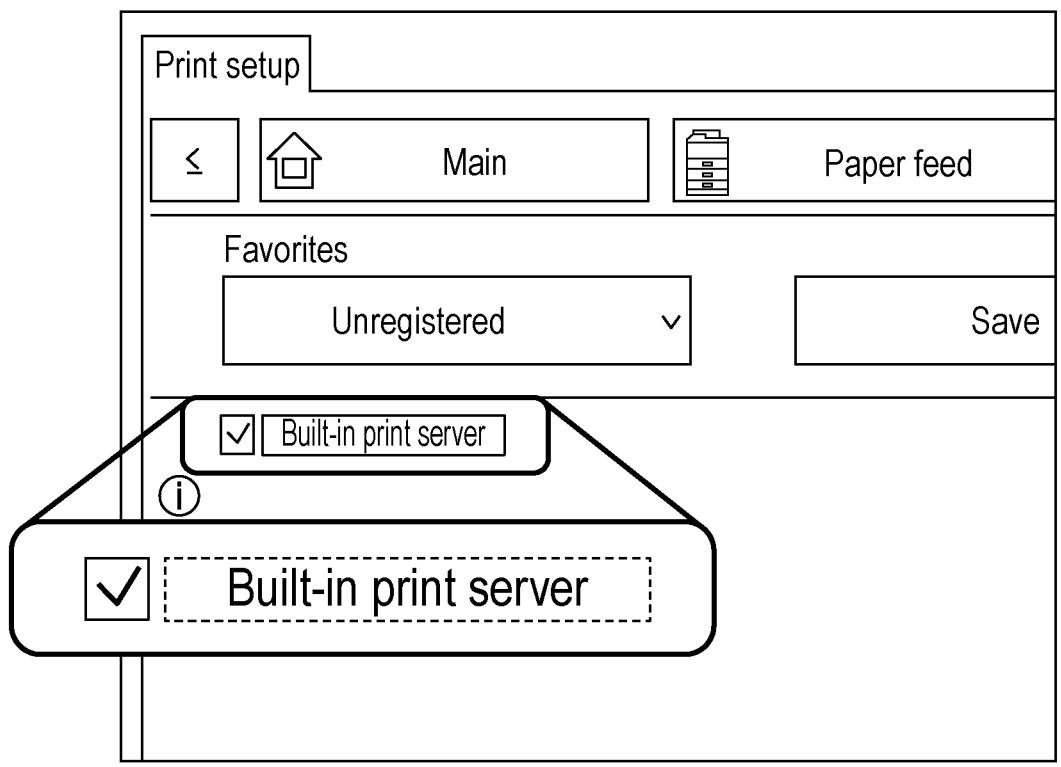
FIG. 4 is a first diagram for describing an exemplary printing operation using the function of a built-in print server in the first embodiment.

FIG. 4 is a diagram for describing an example of the setting in the transmission of the print data to the main apparatus in the notebook computer 210. In the generation of the print data, the user logs in a dialog box concerning the printing using an identifier (ID) of the user. After the login, the dialog box is displayed in a display of the notebook computer 210. Part of the dialog box is illustrated in FIG. 4. An option for determining whether the function of the built-in print server is used is prepared in the dialog box illustrated in FIG. 4. When the user checks the option of the built-in print server to select the function of the built-in print server, not the normal printing but the printing using the function of the built-in print server is selected. In this case, the print data generated in the notebook computer 210 is transmitted to the main apparatus in association with the ID of the user. The print data is then stored in the storage device 102 in the main apparatus.

When the user does not check the option of the built-in print server, the normal printing is selected. In this case, the main apparatus 100 and the sub apparatuses 200, 201, and 202 are displayed as options of the destination of the transmission of the print data on a selection screen of a printer (not illustrated). Upon selection of any of the main apparatus 100 and the sub apparatuses 200, 201, and 202 by the user, the print data is transmitted to the selected image forming apparatus. Then, the printing is performed in the image forming apparatus to which the print data is transmitted for output.

The operation to select the function of the built-in print server using the printing dialog box to set the print data so as to be transmitted to the main apparatus 100 is performed by the user at the computer side.

Next, the user moves to a location where the image forming apparatus with which the print data stored in the main apparatus is to be output is installed and selects the print data with the operation unit 105 to instruct the printing. The image forming apparatus with which the print data is to be output may be any of the sub apparatuses 200, 201, and 202 and may be any of the main apparatus 100 and the sub apparatuses 200, 201, and 202.

Figure 5:
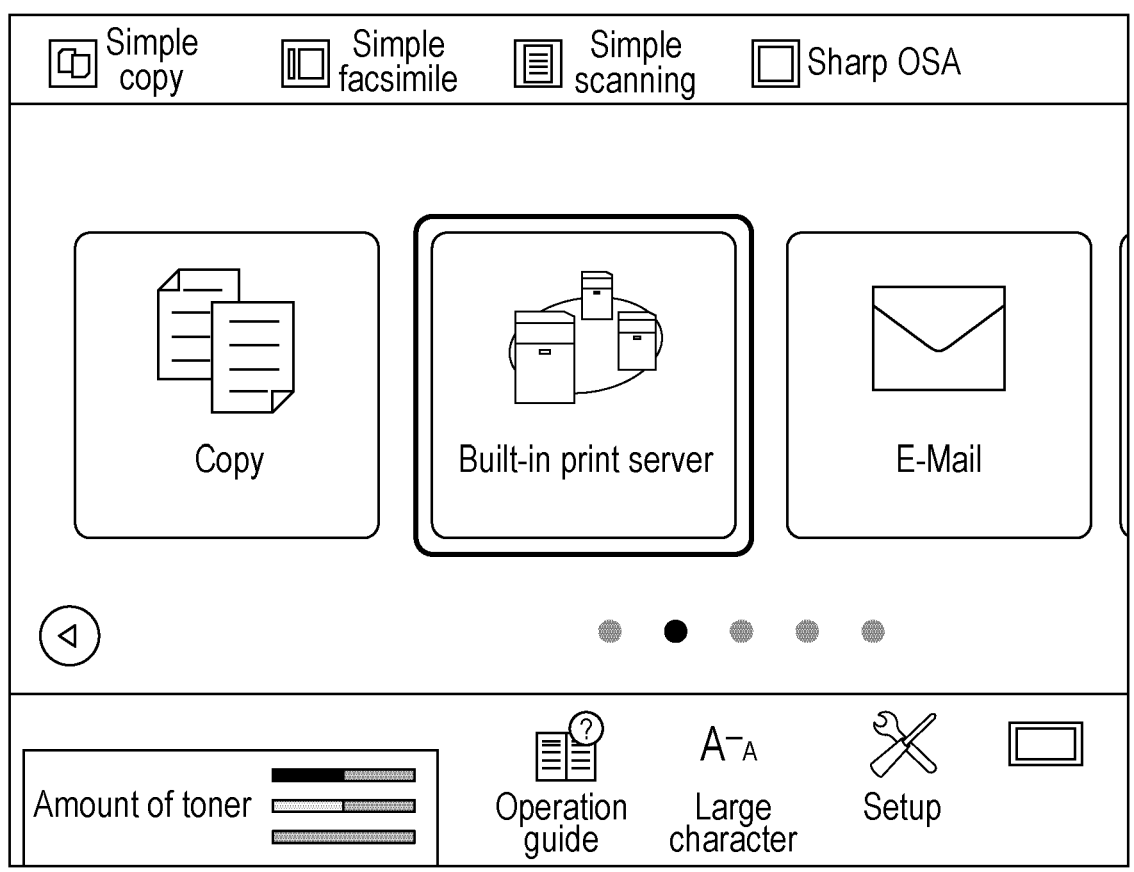
FIG. 5 is a second diagram for describing an exemplary printing operation using the function of the built-in print server in the first embodiment.

FIG. 5 and FIG. 6 are diagrams for describing screens used by the user to instruct acquisition of the print data stored in the main apparatus 100 and printout of the print data. Upon login to the main apparatus or the sub apparatus by the user using the ID of the user with the operation unit 105 at a location where the main apparatus or the sub apparatus with which the print data is to be output is installed, an operation screen illustrated in FIG. 5 is displayed. For example, the operation screen illustrated in FIG. 5 is displayed in the sub apparatus 200. The login ID is the same as the one used in the login to the print dialog box described above.

Upon touching of a "Built-in print server" operation key by the login user on the operation screen in FIG. 5, access to the main apparatus 100 is performed in response to the operation by the user. A list of the pieces of print data (hereinafter also referred to as a print data list) associated with the ID of the login user, in the print data stored in the storage device 102 in the main apparatus, is displayed in the operation unit in the sub apparatus 200 (refer to FIG. 6).

The main apparatus 100 stores the access of the request to transmit the print data from the sub apparatus 200 in the storage device 102 as the access history. The storage device 102 stores the histories of all the sub apparatuses from which the request to transmit the print data has been transmitted as the access histories. In other words, also when the request to transmit the print data is received from the image forming apparatus other than the sub apparatus 200, the transmission request is stored as the access history.

Upon selection of the print data which the user wants to output from the print data list illustrated in FIG. 6 and pressing of a "Print" key by the user, a request for the selected print data is transmitted to the main apparatus 100 in response to the operation by the user. In response to the request, the print data is transmitted from the main apparatus 100 to the sub apparatus 200. The sub apparatus 200, which has received the print data, prints out the received print data.

Although the example is described above in which the printing is performed in the sub apparatus 200, the operational process when the printing is performed in the main apparatus 100, the sub apparatus 201, or the sub apparatus 202 is the same as the one when the printing is performed in the sub apparatus 200. When the printing is performed in the main apparatus 100, the transmission of the request as the sub apparatus and the acquisition of the print data as the main apparatus are performed in the host apparatus.

FIG. 7A and FIG. 7B are flowcharts illustrating exemplary processes performed by the main apparatus and the sub apparatus in the printing using the function of the built-in print server.

The processes are described according to the flowcharts. It is supposed here that the user prints out the print data with the sub apparatus 200, as in the above example, for clarity. It is also supposed here that the sub apparatus 200 has the same configuration as that of the main apparatus 100.

Upon login to the sub apparatus 200 by the user with the operation unit 105 in the sub apparatus 200 in order to output the print data from the sub apparatus 200, the operation screen illustrated in FIG. 5 is displayed. Referring to FIG. 7A, in Step S11, the sub apparatus 200 determines whether the "Built-in print server" is selected on the operation screen illustrated in FIG. 5. If the operation to select the "Built-in print server" is accepted from the user on the operation screen illustrated in FIG. 5 (YES in Step S11), the control unit 104 in the sub apparatus 200 requests the print data list. Specifically, in Step S13, the control unit 104 in the sub apparatus 200 requests the print data list associated with the ID of the login user, in the print data stored in the storage device 102 in the main apparatus 100, from the main apparatus 100. More specifically, the control unit 104 in the sub apparatus 200 transmits the request for the print data list, to which the ID of the user used for logging in the sub apparatus is added, to the main apparatus to request the print data list from the main apparatus.

In Step S101, the main apparatus 100 determines whether the request for the print data list is received. If the main apparatus 100 receives the request for the print data list (YES in Step S101), in Step S103, the control unit 104 in the main apparatus 100 searches for the print data that is associated with the same ID as the one added to the received request for the print data list and that is stored in the storage device 102. If the corresponding print data exists (YES in Step S103), in Step S105, the control unit 104 in the main apparatus 100 returns the print data list to the sub apparatus 200. If the corresponding print data does not exist (NO in Step S103), in Step S107, the control unit 104 in the main apparatus 100 returns a response indicating that the print data does not exist to the sub apparatus.

Upon reception of the response from the main apparatus 100, in Step S15, the control unit 104 in the sub apparatus 200 displays the received print data list in the operation unit 105 if the print data exists (Refer to FIG. 6). If the corresponding print data does not exists, the control unit 104 in the sub apparatus 200 displays the absence of the print data. Then, the process illustrated in FIG. 7A is terminated.

Referring to FIG. 7B, in Step S17, the control unit 104 in the sub apparatus 200 determines whether the print data to be output is selected from the print data list displayed in the operation unit 105 in the sub apparatus 200 by the user. If the print data to be output is selected from the print data list by the user (YES in Step S17), in Step S19, the control unit 104 in the sub apparatus 200 requests the selected print data from the main apparatus 100.

In Step S109, the control unit 104 in the main apparatus 100 determines whether the request for the print data is received. If the control unit 104 in the main apparatus 100 determines that the request for the print data is received (YES in Step S109), in Step S111, the control unit 104 in the main apparatus 100 reads out the requested print data from the storage device 102 and transmits the print data that is read out to the sub apparatus 200.

Upon reception of the print data from the main apparatus 100, in Step S21, the control unit 104 in the sub apparatus 200 causes the image forming unit 103 in the sub apparatus 200 to print out the received print data.

<<Association of Working State with Power State of Image Forming Apparatus>>

In the first embodiment, each of the main apparatus 100 and the sub apparatuses 200, 201, and 202 is in one working state, among the following four working states, at one time and makes the transition from one state to another state in response to an event occurring in each image forming apparatus or an operation that is accepted. One power state is associated with each working state. Upon transition of the working state, the power state associated with each working state is also changed. However, when the power state corresponding to the original working state is the same as the power state corresponding to the working state after the transition, the transition of the power state does not occur and the transition of only the working state occurs.

1) Operating state: The working state in which power is applied to each component in the main apparatus 100 illustrated in FIG. 2 and a process concerning image formation is being performed. Since the main apparatus 100 operates in order to perform a process concerning the image formation while access to the print data is available, the operating state has the largest power consumption. The power state corresponding to the operating state is a quick response available state.

2) Standby state: The working state in which power is applied to each component in the main apparatus 100 illustrated in FIG. 2 but a process concerning the image formation is not being performed. The process concerning the image formation is capable of being immediately started upon reception of the request for the printing process or the request to transmit the print data from an external device. Although access to the print data is available, the standby state has the second largest power consumption. The power state corresponding to the standby state is the quick response available state.

3) Power saving state: The working state in which part of the main apparatus 100, for example, only the communication device 101 is operable and the other components are turned off. Accordingly, since power is applied to the components that are turned off in the power saving state and a startup process is performed in order to operate each component upon reception of the request for the printing process or the request to transmit the print data from an external device, it takes some time to perform the startup. Although access to the print data is not immediately available, the access is available after the startup of each component concerning the access to the print data. In other words, it takes some time to perform the access to the print data. The power consumption in the power saving state is smaller than those in the operating state and the standby state. Specifically, the power state corresponding to the power saving state is a response available state, which is different from the quick response available state described above.

4) Shutdown state: The working state in which each component is turned off and the printing process is not capable of being started even upon reception of the request for the printing process or the request to transmit the print data from an external device. Access to the print data is not available. The power consumption in the shutdown state is smaller than those in the quick response available state and the response available state described above. The power state corresponding to the shutdown state is a response unavailable state.

<<Control of Power State in Association with Power-Off of Main Apparatus>>

A process will now be described, which is performed when a power-off instruction is issued from the user with the power switch (not illustrated) of the main apparatus 100 and the power-off instruction is accepted in a case in which the main apparatus is in either of the operating state ((1) described above) and the standby state ((2) described above), which correspond to the quick response available state, one of the power states.

Upon turning off of the power switch, the control unit 104 determines whether the host apparatus is set as the main apparatus. If the host apparatus is not set as the main apparatus, that is, is the sub apparatus, the control unit 104 changes the working state to the shutdown state. When the power-off instruction is accepted in the operating state, the process concerning the image formation is stopped and the working state is changed to the shutdown state. The power state is changed to the response unavailable state in association with the transition to the shutdown state.

If the host apparatus is set as the main apparatus, the control unit 104 refers to the access histories from the sub apparatuses. Then, the control unit 104 confirms the current working state of the sub apparatus from which the main apparatus has been accessed. If the working states of all the sub apparatuses are the shutdown state, the control unit 104 determines that the degree of access from the sub apparatuses is low and changes the working state of the host apparatus to the power saving state. In association with this, the power state is changed to the response available state. This is because, if the host apparatus is accessed from any sub apparatus, the host apparatus is in a responsive state as the main apparatus although it takes some time to respond to the access. However, if any sub apparatus is in a state other than the shutdown state, the control unit 104 determines that the degree of access from the sub apparatuses is high. In this case, the control unit 104 changes the working state of the host apparatus to the standby state in which the host apparatus is capable of responding to the access from the sub apparatus. In association with this, the power state is changed to the quick response available state. The power state is not changed to the shutdown state.

Figure 8:
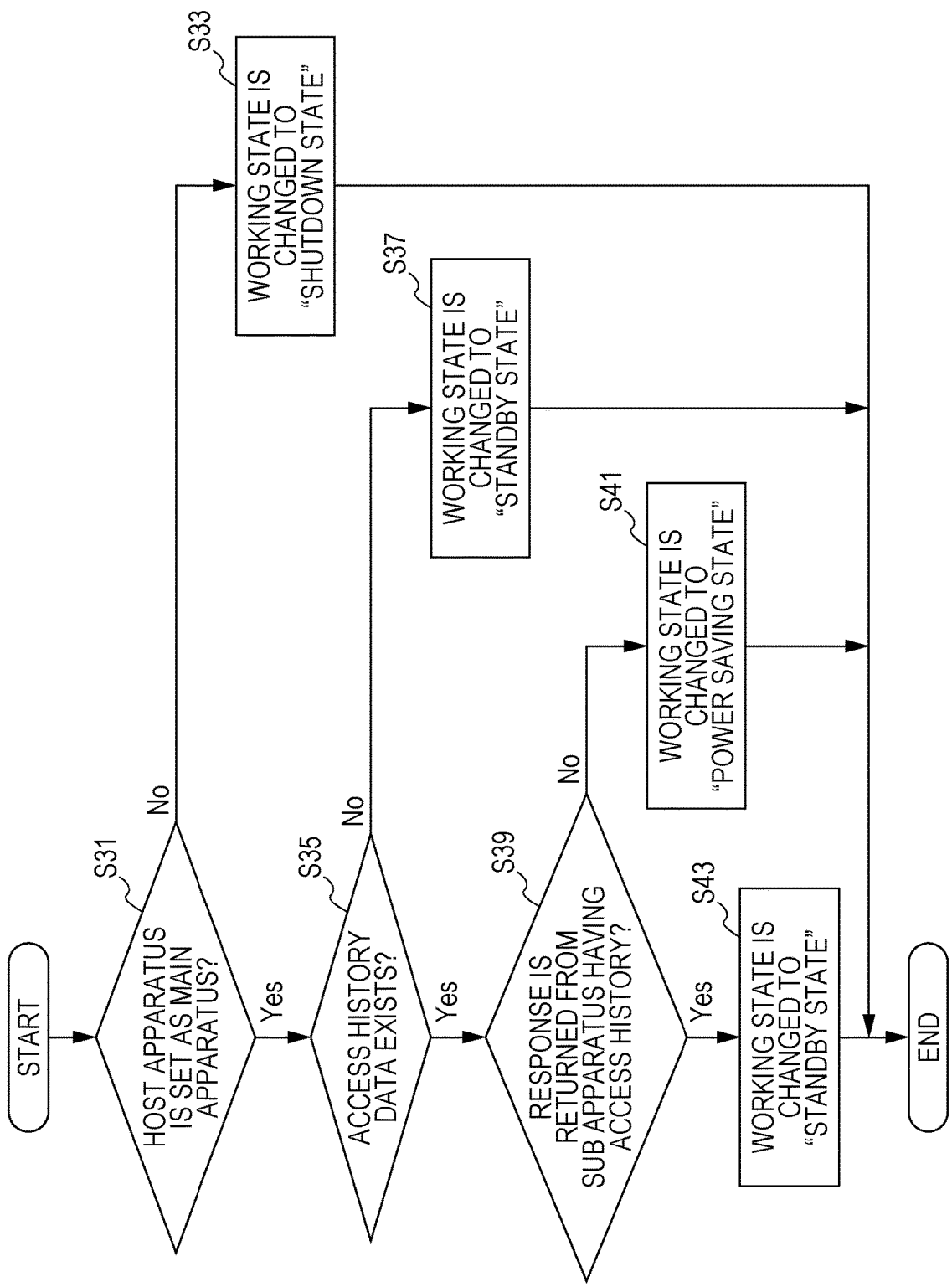
FIG. 8 is a flowchart illustrating an exemplary process in a case in which an event that changes the working state of the main apparatus to a shutdown state occurs in the first embodiment.

FIG. 8 is a flowchart illustrating an exemplary process in a case in which an event that changes the working state of the main apparatus 100 to the shutdown state occurs in the first embodiment.

Referring to FIG. 8, upon reception of an operation to turn off the power switch, in Step S31, the control unit 104 in the main apparatus refers to the storage device 102 to determine whether the host apparatus is set as the main apparatus.

If the host apparatus is not set as the main apparatus (NO in Step S31), in Step S33, the control unit 104 changes the working state to the shutdown state. Then, the process illustrated in FIG. 8 is terminated.

If the host apparatus is set as the main apparatus (YES in Step S31), in Step S35, the control unit 104 determines whether the access history exists in the storage device 102. When the access history does not exist, the request to transmit the print data is received from no external device. In such a case, the host apparatus may be accessed from no external device because the host apparatus is newly installed. Accordingly, if the control unit 104 determines that the access history does not exist (NO in Step S35), in Step S37, the control unit 104 changes the working state to the standby state so as to enable quick response to any new access from an external device. In association with this, the power state is changed to the quick response available state. Then, the process illustrated in FIG. 8 is terminated.

If the control unit 104 determines that the access history exists (YES in Step S35), in Step S39, the control unit 104 determines whether a response is received from the sub apparatus the access history of which exists through communication. When the access histories of multiple sub apparatuses exist, the control unit 104 determines whether a response is received from each of the sub apparatuses. In other words, the control unit 104 determines whether the sub apparatus the access history of which exists is in a communicable state, that is, in a state other than the shutdown state.

If a response is returned from any sub apparatus the access history of which exists (YES in Step S39), the control unit 104 determines that the possibility of access from the sub apparatuses is high. In Step S43, the control unit 104 changes the working state of the host apparatus to the standby state so as to realize quick response to any access. In association with this, the power state is changed to the quick response available state.

If a response is not returned from any sub apparatus the access history of which exists (NO in Step S39), the control unit 104 determines that the possibility of access from the sub apparatuses is low. In Step S41, the control unit 104 changes the working state of the host apparatus to the power saving state. In association with this, the power state is changed to the response available state.

Figure 9:
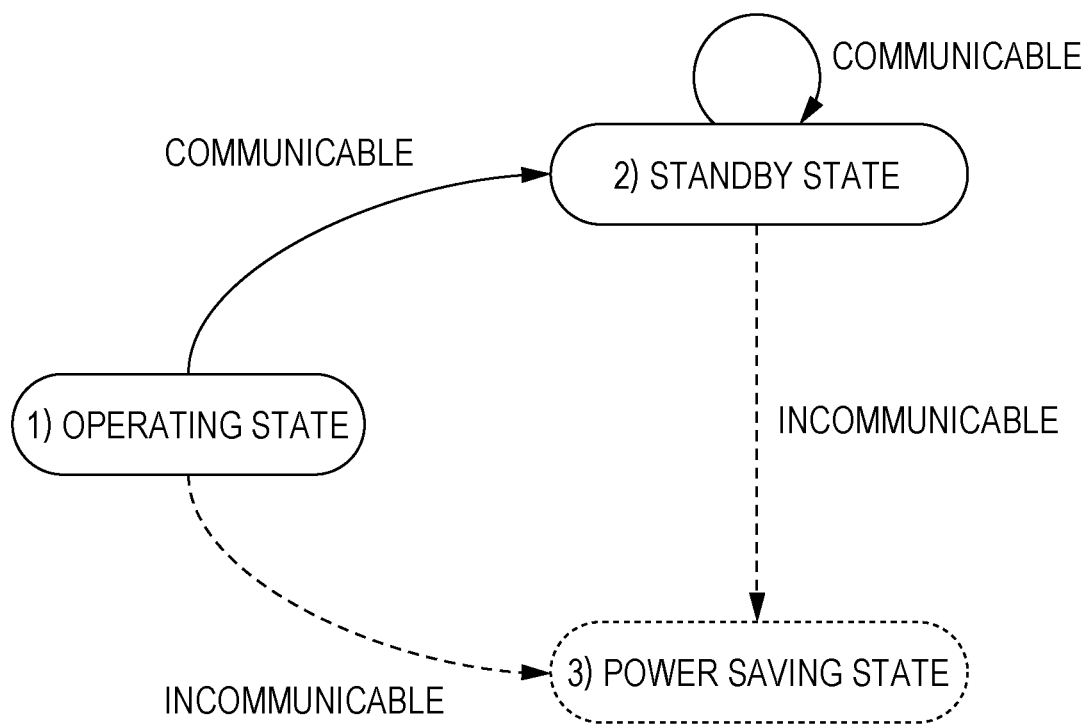
FIG. 9 is a state transition diagram of a power state, which corresponds to the transitions from Step S35 to Step S43 in FIG. 8.

FIG. 9 is a state transition diagram illustrating how the power state is changed in association with the transitions of the working state from Step S35 to Step S43 in the process illustrated in FIG. 8.

Three substantially elliptical shapes illustrated in FIG. 9 indicate different working states. Specifically, the three substantially elliptical shapes indicate the three working states: the operating state, the standby state, and the power saving state. Solid-line substantially elliptical shapes indicate that the corresponding power state is the quick response available state. A chain-line substantially elliptical shape indicates that the corresponding power state is the response available state. In other words, the quick response available state corresponds to the operating state and the standby state as the power state, and the response available state corresponds to the power saving state as the power state.

A solid-line arrow indicates the transition when a response is returned from any sub apparatus. Chain-line arrows indicate the transition when a response is not returned from any sub apparatus.

In the state transition diagram in FIG. 9, the transition from the operating state to the standby state corresponds to the processing in which the power-off request is received in the operating state and the working state is changed to the standby state because the access history from any sub apparatus does not exist (from NO in Step S35 to Step S37 in FIG. 8). Alternatively, the transition from the operating state to the standby state corresponds to the processing in which the working state is changed to the standby state because a response is returned from any sub apparatus (from YES in Step S39 to Step S43 in FIG. 8).

In the state transition diagram in FIG. 9, the transition from the standby state to the standby state corresponds to the processing in which the power-off request is received in the standby state and the working state is changed to the standby state because the access history from any sub apparatus does not exist (from NO in Step S35 to Step S37 in FIG. 8). Alternatively, the transition from the standby state to the standby state corresponds to the processing in which the working state is changed to the standby state because a response is returned from any sub apparatus (from YES in Step S39 to Step S43 in FIG. 8).

In the state transition diagram in FIG. 9, the transition from the operating state to the power saving state corresponds to the processing in which the power-off request is received in the operating state and the working state is changed to the power saving state because a response is not returned from any sub apparatus (from NO in Step S39 to Step S41 in FIG. 8).

In the state transition diagram in FIG. 9, the transition from the standby state to the power saving state corresponds to the processing in which the power-off request is received in the standby state and the working state is changed to the power saving state because a response is not returned from any sub apparatus (from NO in Step S39 to Step S41 in FIG. 8).

Second Embodiment

An aspect of the working state, which is different from that of the first embodiment, will be described in a second embodiment. Specifically, only one standby state is set in the first embodiment while two kinds of standby states: a standby state A in which the display in the operation unit 105 is turned on and a standby state B in which the display in the operation unit 105 is turned off are set in the second embodiment. The display off state in the standby state B is equal to or similar to the state of the operation unit 105 in the power saving state.

The control unit 104 makes the transition to the standby state B (display off) in the case of the transition to the standby state in response to the power-off request. In contrast, the control unit 104 makes the transition to the standby state A (display on) after the power is turned on or in a case in which the processing concerning the image formation is finished.

Figure 10:
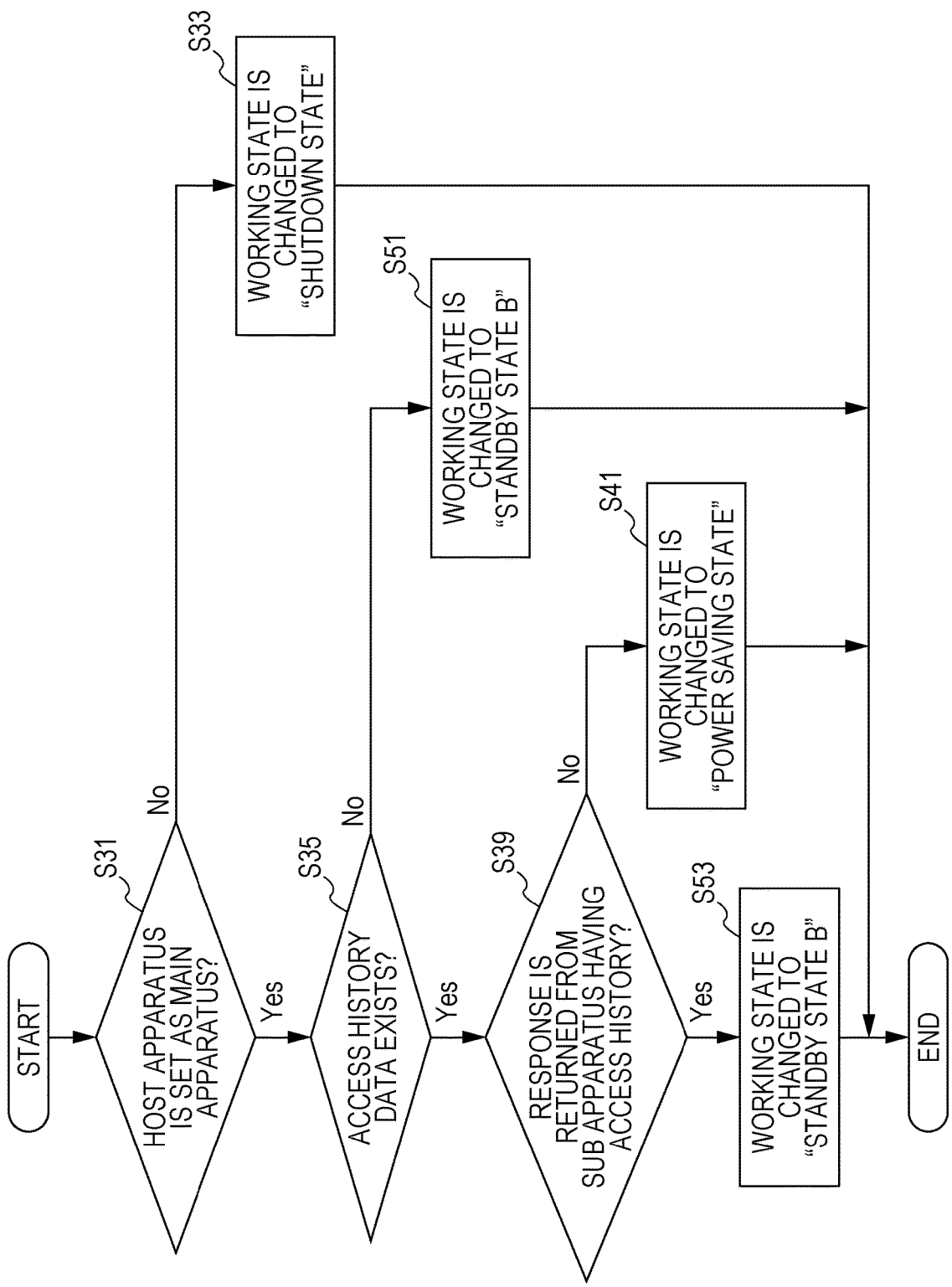
FIG. 10 is a flowchart illustrating an exemplary process in the case in which an event that changes the working state of the main apparatus to the shutdown state occurs in a second embodiment.

FIG. 10 is a flowchart illustrating an exemplary process in which the control unit, which has received the power-off request, changes the working state in the second embodiment. The flowchart in FIG. 10 corresponds to the flowchart in FIG. 8. The same step numbers are used in FIG. 10 to identify the same steps illustrated in FIG. 8. The step numbers different from those in FIG. 8 are Step S51 and Step S53. Both in Step S51 and Step S53, the working state is changed to the standby state B.

Figure 11:
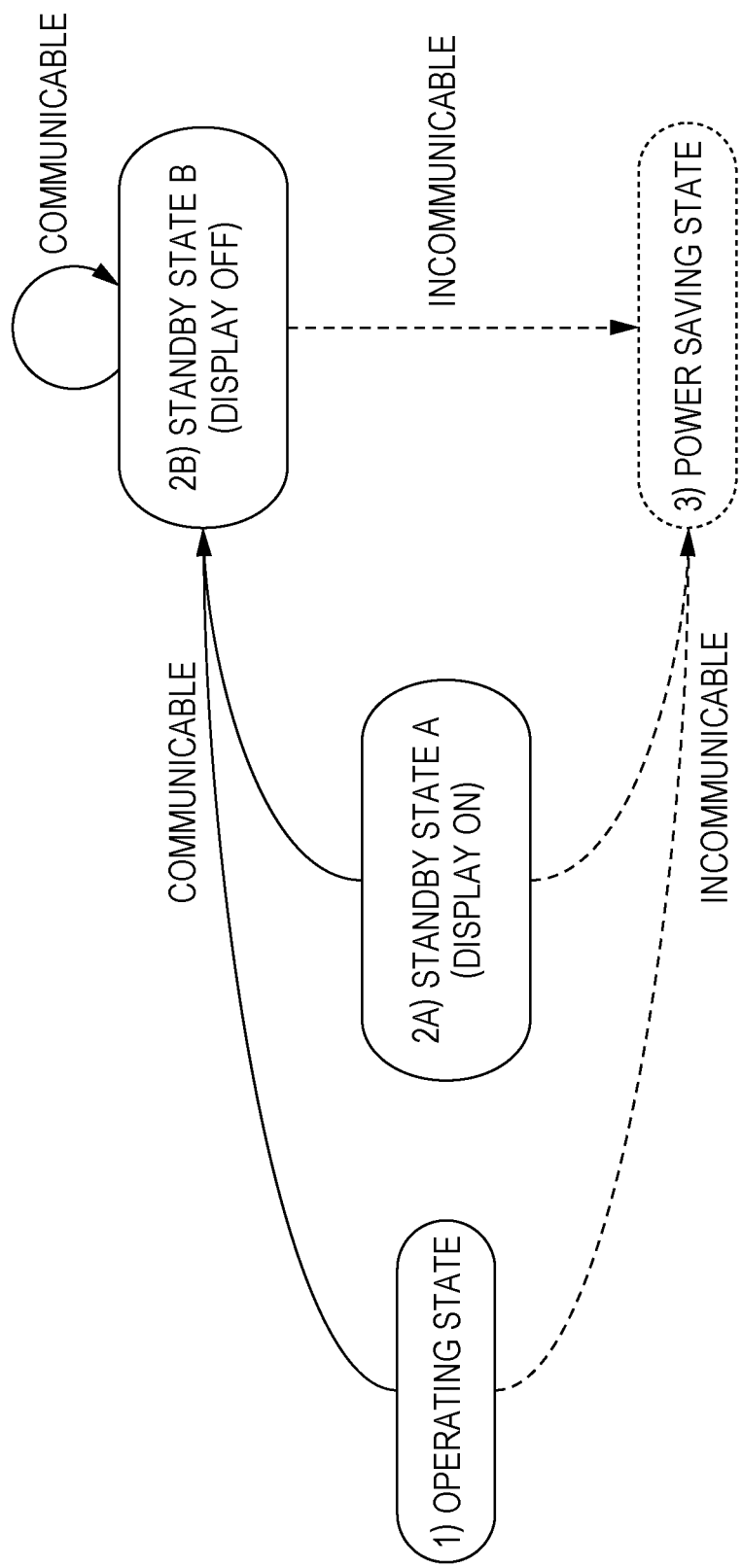
FIG. 11 is a state transition diagram of the power state, which corresponds to the transitions from Step S35 to Step S53 in FIG. 10.

FIG. 11 is a state transition diagram corresponding to the flowchart illustrated in FIG. 10. FIG. 11 corresponds to FIG. 9 in the first embodiment.

As in the state transition diagram in FIG. 9, four substantially elliptical shapes illustrated in FIG. 11 indicate different working states: the operating state, the standby state (display on), the standby state B (display off), and the power saving state.

As in the state transition diagram in FIG. 9, solid-line substantially elliptical shapes indicate that the corresponding power state is the quick response available state. A chain-line substantially elliptical shape indicates that the corresponding power state is the response available state. In other words, the quick response available state corresponds to the operating state, the standby state A, and the standby state B as the power state, and the response available state corresponds to the power saving state as the power state.

Solid-line arrows indicate the transition when a response is returned from any sub apparatus. Chain-line arrows indicate the transition when a response is not returned from any sub apparatus.

In the state transition diagram in FIG. 11, the transition from the operating state to the standby state B corresponds to the processing in which the power-off request is received in the operating state and the working state is changed to the standby state B because a response is returned from any sub apparatus (from YES in Step S39 to Step S53 in FIG. 10).

In the state transition diagram in FIG. 11, the transition from the standby state A to the standby state B corresponds to the processing in which the power-off request is received in the standby state A and the working state is changed to the standby state B because a response is returned from any sub apparatus (from YES in Step S39 to Step S53 in FIG. 10). Since the display is powered off in the operation unit 105, the user recognizes that the control unit 104 responds to the power-off operation.

In the state transition diagram in FIG. 11, the transition from the operating state to the power saving state corresponds to the processing in which the power-off request is received in the operating state and the working state is changed to the power saving state because a response is not returned from any sub apparatus (from NO in Step S39 to Step S41 in FIG. 10).

In the state transition diagram in FIG. 11, the transition from the standby state A to the power saving state corresponds to the processing in which the power-off request is received in the standby state A and the working state is changed to the power saving state because a response is not returned from any sub apparatus (from NO in Step S39 to Step S41 in FIG. 10).

The control unit 104 may sequentially monitor the presence of an operation serving as a trigger to turn on the main apparatus and the working states of the sub apparatuses, for example, after the transition to the standby state B in response to the power-off request, although this is not illustrated in FIG. 10. If a predetermined time period elapses with no trigger to turn on the main apparatus and with all the sub apparatuses being in the shutdown state, the working state may be changed from the standby state B to the power saving state.

The transition from the standby state B to the standby state B and the transition from the standby state B to the power saving state illustrated in FIG. 11 correspond to the above transition. The transition from the standby state B to the standby state B corresponds to a case in which a response is returned from any sub apparatus. The transition from the standby state B to the power saving state corresponds to a case in which the predetermined time period elapses with all the sub apparatuses being in the shutdown state.

Third Embodiment

The case in which the power switch of the main apparatus is turned off by the user is described as an event to cause the main apparatus 100 to makes the transition to the shutdown state in the first embodiment.

However, a process similar to the one when the power-off operation is accepted may be autonomously performed if the main apparatus 100 meets a predetermined condition, not in response to the power-off operation by the user. Such a process is referred to as an autonomous power-off process. For example, an off time when the autonomous power-off process is to be performed, as in the case in which the main apparatus 100 accepts the power-off operation, and an on time when a power-on process (autonomous power-on) is to be autonomously performed after the autonomous power-off may be set in advance. The control unit 104 autonomously changes the working state of the main apparatus 100 at the on time. Alternatively, an aspect may be considered in which the working state of the main apparatus is autonomously changed to the shutdown state if the predetermined time period elapses with no job performed by the main apparatus 100.

As described above, the control unit 104 performs the process illustrated in FIG. 8 also when the main apparatus 100 performs the autonomous power-off.

If the control unit 104 determines that the request for the print data may possibly be submitted from any sub apparatus the access history of which exists, the control unit 104 changes the working state to the power saving state or the standby state so that the main apparatus 100 is capable of responding to the request.

Fourth Embodiment

The aspect is described in the third embodiment in which the main apparatus 100 performs the autonomous power-off and the off time and the on time are set in advance so that the main apparatus 100 performs the autonomous power-on after the autonomous power-off.

In a fourth embodiment, the on time and the off time are set for each sub apparatus, as in the main apparatus 100. The sub apparatus has a function to perform the autonomous power-off at the off time and perform the autonomous power-on at the on time.

The main apparatus 100 requests the sub apparatus the access history of which exists to indicate the off time and the on time set for the sub apparatus. The request may be submitted, for example, at timing when the main apparatus 100 is turned on. Alternatively, the request may be repeatedly submitted after a predetermined time period elapses.

Upon return of the settings of the off time and the on time from the sub apparatus in response to the request, the control unit 104 in the main apparatus 100, which has received the response, stores the settings of the off time and the on time of the sub apparatus in the storage device 102. The sub apparatus for which the off time and the on time are not set returns a response indicating that the off time and the on time are not set to the main apparatus 100.

Upon acquisition of the settings of the off time and the on time from each sub apparatus the access history of which exists, the control unit 104 in the main apparatus 100 refers to the settings and controls the host apparatus so as to perform the autonomous power-off only during a period after the autonomous power-off and before the autonomous power-on of all the sub apparatuses. During a period in which any sub apparatus autonomously returns from the shutdown state, the working state of the host apparatus is changed to either of the power saving state or the standby state to enable the host apparatus to respond to any request for the print data from the sub apparatus.

As described above,
i) an image forming apparatus according to an embodiment includes a communication device that receives print data from an external information device, a storage device that stores the received print data, an image forming unit that prints out the print data stored in the storage device, and a control unit that performs control so as to select any of multiple power states at least including a quick response available state in which the image forming apparatus is capable of communication and is accessible to the print data and a response available state in which the image forming apparatus is not accessible to the print data although being capable of communication and has power consumption smaller than that in the quick response available state. The control unit transmits the print data to an external image forming apparatus in response to a request from the external image forming apparatus, determines whether at least one external certain image forming apparatus is capable of communication if a power-off request is submitted, and makes the transition to the response available state if the external certain image forming apparatus is not capable of communication.

In the present disclosure, the information device includes an information processing apparatus, such as a personal computer, which generates the print data and further includes an image forming apparatus that prints out the print data.

It is sufficient for the print data to be data used by the image forming apparatus for printing and the print data may have any format.

The communication device is an interface circuit used by the image forming apparatus to communicate with an external image forming apparatus or an external information device. Any communication method may be used in the communication device.

The storage device may be a non-volatile memory. Specific aspects of the storage device include, for example, a flash memory and a hard disk drive.

The control unit controls the operation and the working state of each component in the image forming apparatus. In a specific aspect, the function of the control unit is realized by cooperation of software and hardware resources including the CPU or a microcomputer and an input-output circuit.

The power states are provided to manage the power consumption in accordance with the state of the image forming apparatus when the image forming apparatus is operating and is not operating and are associated with the working states of the image forming apparatus. In particular, the power states are defined to suppress the power consumption of the components that are not used when the image forming apparatus is not operating.

Among the working states in the above embodiments, the operating state and the standby state correspond to the quick response available state in the power states in the present disclosure. Among the working states in the above embodiments, the power saving state corresponds to the response available state in the power states in the present disclosure.

When the power state of the image forming apparatus is the quick response available state, the control unit keeps the current quick response available state if the power-off request is accepted and an external certain information device is capable of communication.

When the power state of the image forming apparatus is the response available state, the control unit changes the current response available state to the quick response available state if the power-off request is accepted and an external certain information device is capable of communication.

Aspects of the present disclosure will now be further described.

ii) When the control unit has received a request to transmit the print data from an external image forming apparatus, the control unit may control the image forming apparatus so as to be stored as the certain image forming apparatus in the storage device.

With the above configuration, the image forming apparatus that has accepted the request to transmit the print data is stored as the certain image forming apparatus and does not make the transition to the response unavailable state if the stored image forming apparatus is capable of communication. Accordingly, if the request to transmit the print data is accepted from the image forming apparatus again, it is possible to reliably and rapidly respond to the request.

iii) The control unit may further include an operation unit that accepts an operation by a user. If the operation unit accepts an operation to request transition from the quick response available state to another state from the user, the control unit may attempt to communicate with the certain image forming apparatus and may determine that the certain image forming apparatus is capable of communication not to make the transition to the response available state if at least one image forming apparatus with which the control unit has attempted to communicate is capable of communication.

With the above configuration, the image forming apparatus that has accepted the request to transmit the print data is stored as the certain image forming apparatus and does not make the transition to the response available state if the stored image forming apparatus is capable of communication. Accordingly, if the request to transmit the print data is accepted from the image forming apparatus again, it is possible to reliably and rapidly respond to the request.

iv) The power states may include a response unavailable state in which the image forming apparatus is not capable of communication, is not accessible to the print data, and has the smallest power consumption. The control unit may communicate with each certain image forming apparatus to acquire setting data that is stored in the storage device in the image forming apparatus and that indicates an autonomous power-off time when the target image forming apparatus performs an autonomous power-off process and an autonomous power-on time when the target image forming apparatus autonomously makes the transition to the quick response available state or the response available state after the autonomous power-off, may not perform the autonomous power-off of the host apparatus during a period in which any certain image forming apparatus is not in the response unavailable state based on the acquired setting data, may attempt to communicate with the certain image forming apparatus in the autonomous power-off of the host apparatus during a period after the autonomous power-off and before the autonomous power-on of all the certain image forming apparatuses, and may suppress the autonomous power-off of the host apparatus if at least one image forming apparatus with which the communication is attempted is capable of communication.

With the above configuration, the host apparatus is set in the response available state in a period other than the period after the autonomous power-off and before the autonomous power-on of all the certain image forming apparatuses and, further, the autonomous power-off of the host apparatus is suppressed if at least one certain image forming apparatus is capable of communication in the autonomous power-off of the host apparatus during the period after the autonomous power-off and before the autonomous power-on of all the certain image forming apparatuses. In other words, since the autonomous power-off of the host apparatus is suppressed if any certain image forming apparatus is not in the response unavailable state, it is possible to reliably and rapidly respond to the request if the request to transmit the print data is accepted from the certain image forming apparatus again.

The shutdown state in the above embodiments corresponds to the response unavailable state in the present disclosure.

The aspects of the present disclosure include any combination of aspects, among the multiple aspects described above.

Many modifications may be made for the present disclosure, in addition to the above embodiments. These modifications are not considered so as not to be included in the range of the present disclosure. All the modifications within the meanings equivalent to claims and the above range are included in the present disclosure.

The present disclosure contains subject matter related to that disclosed in Japanese Priority Patent Application JP 2017-109343 filed in the Japan Patent Office on Jun. 1, 2017, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus comprising:
 a communication device that receives print data from an external information device;

a storage device that stores the received print data;
an image forming unit that prints out the print data stored in the storage device; and
a control unit that performs control so as to select any of a plurality of power states at least including a quick response available state in which the image forming apparatus is capable of communication and is accessible to the print data and a response available state in which the image forming apparatus is not accessible to the print data although being capable of communication and has power consumption smaller than that in the quick response available state,
wherein the control unit transmits the print data to an external image forming apparatus in response to a request from the external image forming apparatus, determines whether at least one external certain image forming apparatus is capable of communication if a power-off request is submitted in the quick response available state, and makes the transition to the response available state if the external certain image forming apparatus is not capable of communication.

2. The image forming apparatus according to claim 1, wherein, when the control unit has received a request to transmit the print data from an external image forming apparatus, the control unit controls the image forming apparatus so that information about the external image forming apparatus which has sent to the control unit the request to transmit the print data is to be stored as the certain image forming apparatus in the storage device.

3. The image forming apparatus according to claim 2, wherein the control unit further includes an operation unit that accepts an operation by a user, and
wherein, if the operation unit accepts an operation to request transition from the quick response available state to another state from the user, the control unit attempts to communicate with the certain image forming apparatus and determines that the certain image forming apparatus is capable of communication not to make the transition to the response available state if at least one image forming apparatus with which the control unit has attempted to communicate is capable of communication.

4. The image forming apparatus according to claim 2, wherein the power states include a response unavailable state in which the image forming apparatus is not capable of communication, is not accessible to the print data, and has the smallest power consumption,
wherein the storage device stores, as setting data, a time when autonomous transition to the response unavailable state is performed and a time when autonomous transition to the quick response available state or the response available state is performed after the transition, and
wherein the control unit attempts to communicate with the certain image forming apparatus at the time when the transition to the response unavailable state is performed and determines that the certain image forming apparatus is capable of communication not to make the transition to the response unavailable state if at least one image forming apparatus with which the control unit has attempted to communicate is capable of communication.

5. The image forming apparatus according to claim 4, wherein the control unit communicates with each certain image forming apparatus to acquire the setting data that is stored in the storage device in the image forming apparatus and that indicates an autonomous power-off time when the target image forming apparatus performs an autonomous power-off process and an autonomous power-on time when the target image forming apparatus autonomously makes the transition to the quick response available state or the response available state after the autonomous power-off, does not perform the autonomous power-off of the host apparatus during a period in which any certain image forming apparatus is not in the response unavailable state based on the acquired setting data, attempts to communicate with the certain image forming apparatus in the autonomous power-off of the host apparatus during a period after the autonomous power-off and before the autonomous power-on of all the certain image forming apparatuses, and suppresses the autonomous power-off of the host apparatus if at least one image forming apparatus with which the communication is attempted is capable of communication.

6. An image forming apparatus capable of communicating with an external image forming apparatus, the image forming apparatus comprising:
a control unit that controls the image forming apparatus so as to operate in a first working state or a second working state having power consumption smaller than that in the first working state,
wherein, upon acceptance of a request to change to the second working state in the first working state, the control unit controls the image forming apparatus so as to make the transition to the second working state if the image forming apparatus is not capable of communicating with the external image forming apparatus.

7. A state controlling method causing a computer controlling an image forming apparatus to perform:
receiving print data from an external information device and storing the print data in a storage device;
transmitting, upon reception of a request from an external image forming apparatus, the print data to the image forming apparatus; and
changing one power state to another power state, among a plurality of power states at least including a quick response available state in which the image forming apparatus is capable of communication and is accessible to the print data and a response available state in which the image forming apparatus is not accessible to the print data although being capable of communication and has power consumption smaller than that in the quick response available state,
wherein, upon reception of a power-off request in the quick response available state, it is determined whether an external certain image forming apparatus is capable of communication and the power state is changed to the response available state if the external certain image forming apparatus is not capable of communication.

8. An image forming system comprising:
an image forming apparatus serving as a main apparatus;
at least one image forming apparatuses serving as a sub apparatus; and
at least one information device,
wherein the main apparatus, the sub apparatus, and the information device are communicably connected to each other,
wherein the main apparatus includes
a main apparatus communication device that receives print data from any information device,
a main apparatus storage device that stores the received print data, a main apparatus image forming unit capable of printing the print data, and a main apparatus control unit that transmits the print data to the sub apparatus in response to a request from the sub apparatus and performs control so as to select any of a plurality of power states at least including a quick response available state in which the main apparatus is capable of communication and is accessible to the print data and a response available state in which the main apparatus is not accessible to the print data although being capable of communication and has power consumption smaller than that in the quick response available state, wherein the sub apparatus includes a sub apparatus communication device that requests print data stored in the main apparatus and receives the print data, a sub apparatus image forming unit that prints out the print data received from the main apparatus, and a sub apparatus control unit that controls a process concerning the printing, and wherein, if a power-off request is received in the quick response available state, the main apparatus control unit determines whether the sub apparatus is capable of communication and changes the power state of the main apparatus to the response available state if the sub apparatus is not capable of communication.

* * * * *